US008900696B2

(12) United States Patent
Kliesch et al.

(10) Patent No.: US 8,900,696 B2
(45) Date of Patent: Dec. 2, 2014

(54) ANTIMICROBIALLY MODIFIED, COATED, BIAXIALLY ORIENTED POLYESTER FILM

(75) Inventors: Holger Kliesch, Ginsheim-Gustavsburg (DE); Bodo Kuhmann, Runkel (DE); Thomas Hackl, Huenstetten (DE); Martin Jesberger, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 257 days.

(21) Appl. No.: 12/742,107

(22) PCT Filed: Nov. 5, 2008

(86) PCT No.: PCT/EP2008/009307
§ 371 (c)(1),
(2), (4) Date: May 10, 2010

(87) PCT Pub. No.: WO2009/062617
PCT Pub. Date: May 22, 2009

(65) Prior Publication Data
US 2010/0247889 A1    Sep. 30, 2010

(30) Foreign Application Priority Data

Nov. 14, 2007 (DE) .......................... 10 2007 054 133

(51) Int. Cl.
| B32B 27/36 | (2006.01) |
| B29C 47/06 | (2006.01) |
| C08J 7/06 | (2006.01) |
| C08K 5/544 | (2006.01) |
| C09D 5/14 | (2006.01) |
| C09D 7/12 | (2006.01) |
| C08K 5/00 | (2006.01) |
| C08K 5/19 | (2006.01) |

(52) U.S. Cl.
CPC .............. C08J 7/065 (2013.01); C08K 5/544 (2013.01); C09D 5/14 (2013.01); C09D 7/1233 (2013.01); C08J 2367/02 (2013.01); C08K 5/0058 (2013.01); C08K 5/19 (2013.01)
USPC ....................... 428/220; 428/336; 264/173.16

(58) Field of Classification Search
USPC ................................ 428/220, 336; 264/173.16
See application file for complete search history.

(56) References Cited

U.S. PATENT DOCUMENTS

| 4,571,363 A | 2/1986 | Culbertson et al. |
| 5,064,722 A | 11/1991 | Swofford et al. |
| 5,672,428 A | 9/1997 | Muschelweicz et al. |
| 5,728,339 A | 3/1998 | Farrar |
| 6,723,428 B1 * | 4/2004 | Foss et al. ..................... 428/370 |
| 6,863,954 B2 * | 3/2005 | Peiffer et al. ................. 428/323 |
| 2004/0147654 A1 | 7/2004 | Kimura |
| 2005/0008613 A1 * | 1/2005 | Peterson et al. ........... 424/78.27 |
| 2005/0089539 A1 * | 4/2005 | Scholz et al. ................. 424/401 |
| 2005/0152955 A1 * | 7/2005 | Akhave et al. ............... 424/445 |
| 2007/0227557 A1 | 10/2007 | Ohlhausen |

FOREIGN PATENT DOCUMENTS

| DE | 101 41 599 A1 | 3/2002 |
| EP | 0 031 202 A2 | 7/1981 |
| EP | 0 031 203 A2 | 7/1981 |
| EP | 0 076 582 A1 | 4/1983 |
| EP | 0 144 878 A2 | 6/1985 |
| EP | 0 297 538 A2 | 1/1989 |
| EP | 1 165 317 | 8/2000 |
| EP | 1 097 809 A1 | 5/2001 |
| EP | 1 138 480 A2 | 10/2001 |
| EP | 1 583 793 | 7/2004 |
| EP | 1 471 098 A1 | 10/2004 |
| JP | S59-164342 3 | 3/1983 |
| JP | H06-212003 | 8/1994 |
| JP | H11-035718 2 | 2/1999 |
| JP | 11 193 358 A | 7/1999 |
| WO | WO 92/15198 A1 | 9/1992 |
| WO | 97/42824 A1 | 11/1997 |
| WO | WO 98/06575 A1 | 2/1998 |
| WO | WO 02/062577 A1 | 8/2002 |
| WO | WO 2004/063254 A1 | 7/2004 |
| WO | WO 2005/042657 A2 | 5/2005 |
| WO | WO 2006/000755 A2 | 1/2006 |
| WO | WO 2006/102858 A2 | 10/2006 |
| WO | WO 2006/102957 A2 | 10/2006 |

* cited by examiner

Primary Examiner — Aaron Austin
Assistant Examiner — Tahseen N Khan
(74) Attorney, Agent, or Firm — ProPat, L.L.C.

(57) ABSTRACT

The invention relates to a polyester film comprising at least one base layer (B) and at least one antimicrobially active coating, where this antimicrobial coating
a) comprises an ammonium silane of the following formula (I):

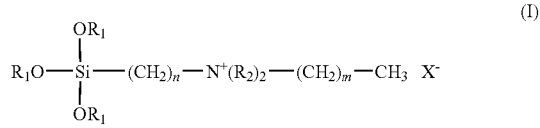

where
$R_1$ and $R_2$ are in each case identical or different and, independently of each other, are hydrogen moieties or C1-C8-alkyl moieties, which are straight-chain or—in the case of C3-C8-alkyl moieties—can be branched, $R_1$ and $R_2$ preferably being identical and being $—CH_3$; in aqueous dispersions, one, two or all of the $R_1$ moieties are hydrogen;
n is greater than 0 and smaller than 10, preferably from 2 to 5, and particularly preferably 3;
m is greater than 0 and smaller than 30, preferably from 6 to 25, and particularly preferably from 15 to 20, and very particularly preferably 17;
$X^-$ is chloride, sulfate, or nitrate;
and
b) the thickness of the coating is smaller than 1 μm, preferably smaller than 0.3 μm, and particularly preferably smaller than 0.15 μm.

25 Claims, No Drawings

ANTIMICROBIALLY MODIFIED, COATED, BIAXIALLY ORIENTED POLYESTER FILM

CROSS-REFERENCE TO RELATED APPLICATIONS

This application is being filed under Rule 1.371 as a National Stage Application of pending International Application No. PCT/EP2008/009307 filed Nov. 5, 2008, which claims priority to the following parent application: German Patent Application No. 10 2007 054 133.5, filed Nov. 14, 2007. Both International Application No. PCT/EP2008/009307 and German Patent Application No. 10 2007 054 133.5 are hereby incorporated by reference herein in their entirety.

FIELD OF THE INVENTION

The invention relates to an antimicrobially modified biaxially oriented polyester film, composed of at least one base layer (B) and of a coating applied on at least one surface, which comprises ammonium silanes of the general formula I. The invention further relates to a process for the production of the film and to the use of the film.

BACKGROUND OF THE INVENTION

The films of the invention, and items produced therefrom, are particularly suitable for use in medical equipment and packaging, walls of cold stores (e.g. as laminate on steel), surfaces in large-scale kitchens, hospitals, etc. The films particularly have very good suitability for the covering and therefore the protection of metallic surfaces, to which the films are heat-sealed or are laminated using adhesives.

Antimicrobially modified, biaxially oriented polyester films are known.

WO 2002/062577, (whose United States equivalent is U.S. Pat. No. 5,906,823) describes polyester films antimicrobially modified using triclosan. The migration of triclosan from PET is very slow, however, and effective antimicrobial action is therefore possible only with high loadings. Triclosan is moreover a chlorinated organic compound, which can react further during the regrinding process (e.g. of the film edge trims arising in the film production process) to give potentially toxic chlorine compounds. Triclosan is, moreover, undesirable in many applications for environmental reasons and because of the risk of development of resistance.

WO 2006/000755, (whose United States equivalent is United States Patent Application Publication No. 2008/044458) describes polyester films equipped with a zirconium phosphate comprising silver ions. Because of the layer structure of these phosphates, only small gaps are available for escape of the silver, and this likewise means that relatively high loadings are necessary for effective defense from microorganisms.

EP-A-1 583 793, (whose United States equivalent is United States Patent Application Publication No. 2004/063254) proposes a number of potentially suitable antimicrobial substances for coatings. The examples use silver-containing biocides. The coating is applied from a solvent in a process step after film production, generating additional costs and pollution of the environment (solvent). The sealing properties described (Examples 5-8) provide evidence of reduced mechanical and thermal resistance of the coatings. This means that the films are easily damaged by cleaning with conventional household cleaners and that they are "tacky" because of the sealing properties described. The films described in Examples 1-4 of EP-A-1 583 793 with improved water barrier are completely unsuitable as antimicrobial films in which a biocide has to migrate to the surface with the aid of water, for example, from a film layer situated under the coating. The SARAN® material on which the coating described in that document is based is moreover a chlorinated polymer which is environmentally hazardous and unsuitable for regrind and reuse in polyester films.

SUMMARY OF ADVANTAGEOUS EMBODIMENTS OF THE INVENTION

It was an object of the present invention to provide a film which has antimicrobial effects and is based on biaxially stretched polyesters, which has an antimicrobial coating applied in-line, and thus avoids the disadvantages mentioned of the prior art.

DETAILED DESCRIPTION OF ADVANTAGEOUS EMBODIMENTS OF THE INVENTION

The object is achieved via a polyester base film with a thickness of from 5 to 500 μm, to which, at least on one side, a coating with antimicrobial effect has been applied in-line, where this antimicrobial coating
a) comprises an ammonium silane of the following formula (I):

where
$R_1$ and $R_2$ are in each case identical or different and, independently of each other, are hydrogen moieties or C1-C8-alkyl moieties, which are straight-chain or—in the case of C3-C8-alkyl moieties—can be branched, $R_1$ and $R_2$ preferably being identical and being —$CH_3$; in aqueous dispersions, one, two or all of the $R_1$ moieties are hydrogen;
n is greater than 0 and smaller than 10, preferably from 2 to 5, and particularly preferably 3;
m is greater than 0 and smaller than 30, preferably from 6 to 25, and particularly preferably from 15 to 20, and very particularly preferably 17;
$X^-$ is chloride, sulfate, or nitrate; and
b) the thickness of the coating is smaller than 1 μm, preferably smaller than 0.3 μm and particularly preferably smaller than 0.15 μm.

The base film of the invention is a single- or multilayer film.

Particular preference is given to a multilayer structure in which, in addition to the base layer (B), there is a further layer (A) under the antimicrobial coating applied in-line, which comprises an antimicrobial agent, which is preferably based on silver/silver ions as biocide. The thickness of this layer (A) is <10 μm, preferably <5 μm and particularly preferably <3.5 μm.

In another preferred embodiment, the film is at least a three layer film and then has not only the abovementioned (A), but also at least one further layer (C), located on that side of the base layer (B) opposite to the layer (A), and having no antimicrobial coating, but being sealable, thus permitting the film to be laminated inter alia to steel sheet and to other polymers. Sealable layers are described by way of example in EP-A-1 138 480, (whose United States equivalent is United States Patent Application Publication No. 2001/035593A1), EP-A-1 097 809, (whose United States equivalent is U.S. Pat. No. 6,878,442 B1) EP-A-1 471 098, (whose United States equivalent is United States Patent Application Publication No. 2004/229060A1) and EP-A-1 165 317, and are generally composed of copolyesters.

The Polyester Base Film

The base layer of the film is preferably composed of at least 80% by weight of a thermoplastic polyester. A maximum of 20% by weight of polyamides, polyetherimides, and/or other polymers can be present alongside polyesters. The proportion of these polymers is preferably below 5% by weight and particularly preferably <1% by weight.

Examples of suitable polyesters are those composed of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid (=poly-1,4-cyclohexanedimethylene terephthalate, PCDT), and also of ethylene glycol, naphthalene-2,6-dicarboxylic acid, and biphenyl-4,4'-dicarboxylic acid (=polyethylene 2,6-naphthalate bibenzoate, PENBB). Preference is given to polyesters which are composed of at least 60 mol %, particularly preferably at least 80 mol %, of ethylene glycol units and terephthalic acid units. The remaining monomer units derive from other aliphatic, cycloaliphatic, or aromatic diols and, respectively, dicarboxylic acids.

Examples of other suitable aliphatic diols are diethylene glycol, triethylene glycol, polyethylene glycol of the general formula HO—$((CH_2)_2$—O)n-$(CH_2)_2$—OH, where n is a number from 3 to 1000, aliphatic glycols of the general formula HO—$(CH_2)_n$—OH, where n is a whole number from 3 to 6 (in particular propane-1,3-diol, butane-1,4-diol, pentane-1,5-diol, and hexane-1,6-diol), or branched aliphatic glycols having up to 6 carbon atoms. Among the cycloaliphatic diols, mention may be made of cyclohexanediols (in particular cyclohexane-1,4-diol). Suitable other aromatic diols correspond by way of example to the formula HO—$C_6H_4$—X—$C_6H_4$—OH, where X is —$CH_2$—, —$C(CH_3)_2$—, —$C(CF_3)_2$—, —O—, —S—, or —$SO_2$—. Bisphenols of the formula HO—$C_6H_4$—$C_6H_4$—OH also have good suitability, but their proportion should not exceed 5% by weight, preferably 1% by weight.

Preferred other aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the ($C_3$-$C_{19}$)-alkanediacids are particularly suitable, where the alkane moiety can be straight-chain or branched.

In a thermoformable embodiment, the base-layer polymer is preferably composed of less than 95 mol % of ethylene glycol units and terephthalic acid units, and particularly preferably of less than 90 mol % of ethylene glycol units and terephthalic acid units.

Polymers for any sealable layer (C) can be found by way of example in the abovementioned EP-A-1 138 480, EP-A-1 097 809, EP-A-1 471 098, EP-A-1 165 317, without any restriction to the blends mentioned in those publications.

The Antimicrobially Modified Outer Layer (A) Preferably Present

The polymer for this outer layer in essence corresponds to that for the base layer (B). Here again, preference is given to polyesters which are composed of at least 60 mol %, and particularly preferably at least 80 mol %, of ethylene glycol units and terephthalic acid units. It has, however, proven advantageous for the polyester to be composed of less than 99 mol %, and preferably less than 97 mol %, of ethylene glycol units and terephthalic acid units. An increased proportion of copolyester facilitates the release of the silver atoms/silver ions preferably used from the antimicrobial agent into the medium situated thereabove, thus improving effectiveness. On the other hand, however, it also impairs the resistance characteristics of the layer, and can therefore cause rapid loss of activity and alterations in the optical properties of the surface, particularly if the surface is cleaned with cleaning compositions (ethanol, acetone, etc.) comprising solvent. The following ranges are therefore preferable:

|  | Preferred (% by wt.) | Particularly preferred (% by wt.) |
| --- | --- | --- |
| Isophthalic acid (IPA) | 1-10 | 4-8 |
| DEG (diethylene glycol) | 1-10 | 1-3 |
| Other diols | 0.7-10 | 1-2 |
| Dicarboxylic acids other than terephthalic acid | 1-10 | 1.5-4 |

The copolyester components can be combined with one another. However, particularly for the above-mentioned reasons, no more than two modification components should be selected; the amounts of the other optional components should then be below the ranges stated as preferred. The amounts of the two components in any combination should moreover not be in the region of the upper limits of the preferred range. If there is more than one comonomer component, the amounts of both ideally lie within the range shown as particularly preferred, and this means that a film with 4% by weight of IPA and 2% by weight of DEG (both within the particularly preferred range) should comprise less than 0.7% by weight of other diols and less than 1% by weight of other carboxylic acids (less than the respective lower limit of the preferred range).

The biocide in said layer (A) is preferably based on elemental silver and/or silver ions. Elemental silver can, for example, take the form of nanoparticles (e.g. from Bio-Gate AG, DE), but the silver preferably takes the form of silver ions. These can be used in the form of silver-containing (Ag+) zirconium phosphates (commercially obtainable, for example, as ALPHASAN® from Milliken, Spartanburg, USA) and preferably in the form of silver-containing (Ag+) glasses (such as the IRGAGUARD® B7000 product line from Ciba SC, CH) and particularly preferably in the form of silver-containing (Ag+) zeolites. The latter are obtainable, for example, with trade name BACTEKLER® (Kanebo, JP) or ZEOMIC® (Sinanen, JP).

The elemental silver and/or the particle loaded with silver ions (glass, zirconium phosphate, zeolite) is added at a concentration of from 0.5 to 15% by weight to the layer (A).

Loadings of from 1-6% by weight are preferred here, and from 1.5-3.5% by weight is particularly preferred. The higher the loading with particles, the greater the impairment of surface quality and optical properties of the film, and this means that roughness and haze increase. Haze often impairs the appearance of the finished product (e.g. steel sheet) and is generally undesirable. However, white films or matte-design films are exceptions. High roughness facilitates adhesion of microbes to the surface and is therefore likewise undesirable. The roughness of the surface should generally be below $R_a$=1000 nm, preferably below 600 nm, and particularly preferably below 300 nm.

The median size ($d_{50}$) of the biocide particles here is generally from 0.5 to 15 μm, preferably from 1.8 to 6 μm and particularly preferably from 2.1 to 3.5 μm. It has been found here that although relatively small particles (<1.8 μm) release silver more rapidly, and therefore, for identical loading and silver concentration in the film layer, can give better initial activities than large particles, the high initial activity then falls more rapidly after a number of cleaning cycles (as described below in test methods) than when larger particles (>1.8 μm) are used, these ensuring a longer period of effectiveness. If large particles (>6 μm) are used, and in particular very large particles (>15 μm), the distribution on the surface becomes too non-uniform to ensure adequate effectiveness against bacteria. Although this can be compensated by raising the loading, there are then disadvantages in cost-effectiveness and in the process performance of the film, since excessive loadings, in particular with large particles, cause an increased number of break-offs during film production. Abrasion during production and during further processing, and also in the final use, generally increases with the size of the particle. The result of this abrasion is not only dust (which is always undersirable) but also loss of effectiveness. The range given above, from 2.1 to 3.5 μm, has therefore proven particularly advantageous. It has generally proven disadvantageous for abrasion if the $d_{50}$ value of the size distribution of the particle is more than twice the layer thickness of the layer comprising the particle.

If zeolites are used, the amount of silver in the zeolite is preferably from 0.5 to 20% by weight, and particularly preferably from 3 to 6% by weight. It has moreover proven advantageous for the zeolite to contain from 1 to 20% by weight of zinc and/or copper. The zeolite preferably contains at least 6% by weight of zinc or/and copper. The zeolites are produced by known processes, such as those described by way of example in JP-A-11 193 358, EP-A-0 297 538 or US 2004/147654. Zeolites that can be used in the invention are obtainable by way of example with trade name Bactekiller (Kanebo, JP) or Zeomic (Sinanen, JP).

Irrespective of the nature of the silver addition, the content of silver in the modified layer is from 0.01 to 2.5% by weight and preferably from 0.1 to 0.4% by weight.

The Film in General

The polyesters for all of the layers can, by way of example, be prepared by the transesterification process. This process starts from dicarboxylic esters and from diols, these being reacted with the conventional transesterification catalysts, such as salts of zinc, of calcium, of lithium, of sodium, of magnesium and of manganese. The intermediates are then polycondensed in the presence of familiar polycondensation catalysts, such as antimony trioxide or titanium salts. They can equally well be prepared by the direct esterification process in the presence of polycondensation catalysts. This process starts directly from the dicarboxylic acids and from the diols. Polyesters of the invention are commercially available products.

The film can comprise further inorganic and/or organic particles. Examples of these are calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin, or crosslinked polymer particles, e.g. polystyrene particles or acrylate particles. The proportion of these particles in the antimicrobially modified layer(s) should not exceed 2000 ppm and is preferably below 1000 ppm. An exception to this rule is provided only by white film variants, where the white pigments used (preferably $TiO_2$ or $BaSO_4$) should have a median particle size below 1.8 μm at least in the antimicrobially modified layer, in order to avoid excessive increase of surface roughness.

In one preferred embodiment, the film also comprises at least one UV stabilizer. In principle, any of the organic and inorganic UV stabilizers suitable for incorporation in polyesters can be selected. These suitable UV stabilizers are known and are described in more detail by way of example in WO 98/06575, EP-A-0 144 878, EP-A-0 031 202, (whose United States equivalent is U.S. Pat. No. 4,347,350) EP-A-0 031 203, (whose United States equivalent is U.S. Pat. No. 4,354,016) or EP-A-0 076 582, (whose United States equivalent is U.S. Pat. No. 4,456,746). Examples of suitable compounds are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines, and/or triazines, preference being given to the triazines. That layer of the film which faces toward the light preferably comprises at least 50% more UV stabilizer (in % by weight) than the other layers, the total concentration of light stabilizer in the film preferably being in the range from 0.2% by weight to 5.0% by weight.

The addition of UV stabilizers prevents mechanical failure of the film over the course of time, in particular in outdoor applications. Alongside this, the UV stabilizer also reduces the increase in the yellowness index as the film ages.

If a silver-containing layer is present, however, this leads to a visible yellow to brown tinge on exposure to light, even during production and without aging. Alongside the light stabilizers, the film therefore preferably comprises at least one blue dye, to compensate for the yellow tinge triggered by the silver compound. It is preferable here to use dyes which are soluble in the polyester, rather than pigments, since if the latter are used the amount added has to be increased for the same effect, and these particles generate additional roughness. By way of example the following blue dyes can be used here: Clariant Blue RBL®, Blue RLS® (Ciba, CH); Lanxess (previously Bayer) Blue 3R GRAN®, Blue RR GRAN® (Lanxess, DE); Ciba FILESTER® type Blue GN (Ciba, CH). Alongside the blue dyes, it has also proven advantageous to add a green dye, such as IRGALITE® Green GFNP (Ciba SC, Basle, CH), in order to achieve a neutral color. The content of blue dye is preferably below 200 ppm in the film, and the proportion of green dye is preferably below 100 ppm. In the preferred embodiment, the yellowness index of the film is below 7, and particularly preferably below 3. Color stabilization is particularly important when the regrind arising during production is to be reused. It is advantageous to return a portion of the regrind to the antimicrobially modified outer layer. The proportion of regrind should not exceed 50% by weight in any layer, since higher proportions cause problems in running performance, especially if zeolites are used, because they are hygroscopic.

Alongside these stabilizers and dyes, the film can also comprise optical brighteners, such as Ciba TINOPAL® OB-One (Ciba, CH) or others. However, this addition is less preferred than the addition of blue dye, since optical brighteners can function only in the presence of sufficient UV light.

The total thickness of the polyester film of the invention can vary widely. It is preferably from 5 to 500 µm, particularly preferably from 10 to 51 µm and very particularly preferably from 12 to 23 µm.

The antimicrobial coating comprises ammonium silanes of the following formula (I):

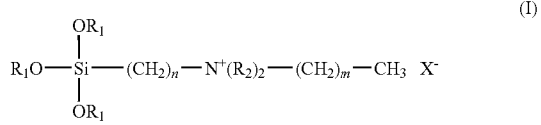

where
R$_1$ and R$_2$ are in each case identical or different and, independently of each other, are hydrogen moieties or C1-C8-alkyl moieties, which are straight-chain or—in the case of C3-C8-alkyl moieties—can be branched, R$_1$ and R$_2$ preferably being identical and being —CH$_3$; in aqueous dispersions, one, two or all of the R$_1$ moieties are hydrogen;
n is greater than 0 and smaller than 10, preferably from 2 to 5, and particularly preferably 3;
m is greater than 0 and smaller than 30, preferably from 6 to 25, and particularly preferably from 15 to 20, and very particularly preferably 17;
X$^-$ is chloride, sulfate, or nitrate.

The ammonium silane bears a positive charge. The counterion is not critical; it usually involves chloride, sulfate, or nitrate, preferably chloride.

These compounds are obtainable by way of example from Aegis (USA) or Sanitized (CH).

The ammonium silanes are coated from aqueous solution or dispersion. Other than water as solvent, the coating solution/dispersion comprises less than 20% by weight, preferably less than 10% by weight, and particularly preferably less than 6% by weight, of other solvents such as methanol, ethanol, acetone, etc. It is particularly preferable that the coating solution/dispersion comprises less than 1% by weight of organic solvent.

The proportion of ammonium silane in the coating solution/dispersion is advantageously from 0.5 to 75% by weight, preferably from 1 to 15% by weight, and particularly preferably from 1.5 to 5% by weight.

It has proven advantageous for the ammonium silanes of the invention to be combined with other coating components which improve adhesion to the polyester. Improved resistance to cleaning (see test methods section before the examples) in particular can be achieved. In one preferred embodiment, the ammonium silanes of the invention are combined with other silanes and/or aminosilanes, such as Z6020 or Z6040 from Dow Corning (USA), A-1100 or A-187 from Union Carbide (USA), or generally the aminosilanes described in U.S. Pat. No. 5,064,722. If these other silanes/aminosilanes are present, their proportion in this embodiment is from 0.5 to 35% by weight, based on the coating dispersion, preferably from 1 to 10% by weight, and particularly preferably from 2 to 7% by weight.

The combination of the ammonium silanes of the invention with acrylates is likewise preferred. Suitable acrylates are described inter alia in U.S. Pat. No. 4,571,363. The above-mentioned proportions of the ammonium silane here are preferably incorporated by stirring from aqueous solution into the finished acrylate dispersion. If acrylate is present in the resultant coating dispersion, its proportion is from 0.5-25% by weight and preferably from 1-6% by weight. In this embodiment, it has surprisingly been found that, for the same amount of ammonium silane of the invention, the combination with the acrylate not only led to no reduction of the antimicrobial activity of the coating but could actually raise the same.

Combination with silicone coatings has also proven advantageous, but this combination has proven less suitable for embodiments with a silver-containing layer under the ammonium silane coating. Suitable silicone coating dispersions are described inter alia in U.S. Pat. Nos. 5,728,339 and 5,672,428.

Production Process

The coating can be applied either on one side or else on both sides, and is achieved "in-line" during polyester film production. The coating dispersion is usually applied to the film after longitudinal stretching and prior to transverse stretching. In the case of simultaneous orientation (longitudinally and transversely in one stretching frame), the coating is applied prior to stretching.

Known processes are used to apply the coating, preference being given to "reverse gravure" and "Meyer bar".

The coating weights in the final condition of the film (dry application weight) are from 0.005-1.3 g/m$^2$, preferred coating weights being from 0.01 to 0.3 g/m$^2$ and particularly preferred coating weights being from 0.02 to 0.1 g/m$^2$. Higher dry weights do not improve antimicrobial effectiveness. This is at its best in the range of the preferred coating weights. Coating homogeneity and abrasion resistance likewise falls as coating weight increases, and is at its best in the range of the particularly preferred coating weights.

The dry application weights are calculated from the wet application weight by the following equation:

Dry application weight in g/m$^2$=(wet application weight in g/m$^2$ minus(weight of water and/or weight of solvent, in each case in g/m$^2$))divided by the area stretching ratio after coating.

The invention also provides a process for the production of the polyester film of the invention, by the extrusion or coextrusion process known from the literature.

The silver-containing biocide present in the raw material of at least one external layer in one preferred embodiment is preferably introduced by way of a masterbatch into the corresponding layer. To this end, silver-containing component and polyester are mixed in a multiscrew extruder and extruded through a pelletizing die and pelletized.

The procedure for the film production process is that the polymers corresponding to the individual layers, if appropriate inclusive of the additives, are melted in an extruder and coextruded through a flat-film dye, the resultant prefilm is drawn off on one or more rolls for solidification, the prefilm is then biaxially stretched, and the biaxially stretched film is heat-set and then wound up.

The biaxial stretching (orientation) is generally carried out in succession, but can take place simultaneously, preference being given to sequential biaxial stretching, where stretching first takes place longitudinally (in machine direction) and then transversely (perpendicular to the machine direction). This leads to spatial orientation of the polymer chains. The longitudinal stretching can be carried out with the aid of two rolls rotating at different speeds corresponding to the desired stretching ratio. For the transverse stretching, an appropriate tenter frame is generally used, in which the film is clamped at the two edges and then drawn toward the two sides at an elevated temperature.

The temperature at which the stretching is carried out can vary relatively widely, and depends on the desired properties of the film. The longitudinal stretching is generally carried out at a temperature in the range of from 80 to 130° C., and the transverse stretching is generally carried out at a temperature in the range from 90 to 150° C. The longitudinal stretching ratio is generally in the range from 2.5:1 to 6:1, and in order to establish the desired mechanical properties (see below) it is preferably in the range from 3.0:1 to 5.5:1. The transverse stretching ratio is generally in the range from 3.0:1 to 5.0:1, and in order to establish the desired mechanical properties (see below) it is preferably in the range from 3.5:1 to 4.5:1.

In the heat-setting which follows, the film is kept for a period of from about 0.1 to 10 s at a temperature of from about 150 to 250° C. The film is then wound up conventionally. Ideal adhesion of the ammonium silanes is achieved if the film is heated in the heat-setting process to at least 180° C., and particularly preferably to at least 220° C. Temperatures above 237° C. are less preferred, since they lead to some degradation of the ammonium silane coating.

The modulus of elasticity of films produced by the above-mentioned process using the starting materials described is, in both directions on the film, greater than 2000 N/mm², preferably greater than 3000 N/mm² and particularly preferably greater than 4300 N/mm². These mechanical properties are advantageous for the use in the invention, since otherwise the film exhibits excessive elongation under mechanical load, and this can lead to damage to the coating, with possible resultant decrease in antimicrobial effectiveness.

ADVANTAGES OF THE INVENTION

The film of the invention has very good effectiveness against bacteria, viruses, algae and fungi. Furthermore, the effect continues even after a number of cleaning cycles. The film moreover is easy to produce. In the sealable variant, it seals with respect to itself and with respect to substrates composed of various polymers, such as polyamide, polycarbonate, and metals (e.g. aluminum, steel, lacquered steel, chromed or tin-coated steel). The film is therefore versatile. However, the film is also particularly suitable in non-sealable variants for application to metals and other substrates by the processes described in WO 2006/102858 A2, (whose United States equivalent is United States Patent Application Publication No. 2008/314512A1) and WO 2006/102957 A2, (whose United States equivalent is United States Patent Application Publication No. 2009/053463A1).

In particular, the combination of ammonium silane coating and silver-containing base layer has good activity against microbes, whereas modification in either only the coating or only the film has shown inadequate activity (e.g. *Aspergillus niger, Pseudomonas* spp., etc.).

The films of the invention, and the items produced therefrom, are suitable by virtue of their excellent combinations of properties for a wide variety of different applications, for example for interior claddings, furniture cladding, air-conditioning systems, filter housings, medical equipment, walls of cold stores, medical packaging, food- or drink-packaging, applications in the sanitary sector, for hygiene items, wound plasters, applications in the apparel sector, and also film applications in greenhouses, etc.

The following test methods were used for the purposes of the present invention to characterize the raw materials and the films:

Measurement of Median Particle Diameter $d_{50}$ on Particles Prior to Introduction into the Raw Material Median particle diameter $d_{50}$ is determined by means of a laser on a MASTERSIZER® (Malvern Instruments, UK) by the standard method. Examples of other measurement equipment are Horiba LA® 500 (Horiba Ltd., JP) or HELOS® (Sympatec GmbH, DE), which use the same measurement principle. For the test, the specimens are placed with water in a cell, and this is then placed in the measurement equipment. The measurement procedure is automatic and also includes mathematical determination of $d_{50}$. $d_{50}$ here is defined as determined as follows from the (relative) cumulative particle size distribution curve: the desired $d_{50}$ is given on the abscissa axis by the intersection of the 50% ordinate value with the cumulative curve.

Measurement of Median Particle Diameter $d_{50}$ on Zeolite Particles in the Film The film is introduced into a scanning electron microscope in such a way that the microbially modified side can be observed. On sections of size 100·100 µm², at 10 different sites on the surface, all of the zeolites >0.4 µm are measured and the median particle size for the sections is determined, and the average for the 10 sections gives the $d_{50}$ value for the particles in the film. The zeolites here can be identified on the basis of their characteristic shape or in the case of doubt by EDX elemental analysis.

The $d_{50}$ value is preferably measured on the (free, commercially available) particles used. If this is not possible, e.g. in the film itself or if the particles are already in finished masterbatch form when delivered, the method using counting in the film can also be selected. It is assumed here that the two test methods lead to identical results within the bounds of accuracy of measurement, and if non-aggressive production methods are used this is indeed the case. If the film producer is aware that, for example, because of high shear forces in the extruders, the median particle diameters in the film are deviating from those of the free, commercially available particles, a series of measurements in the film and standardization using particles with known $d_{50}$ value can be used to produce a correlation between the $d_{50}$ value of the free particles and the $d_{50}$ value of the particles in the film, thus permitting extrapolation from the data measured in the film to give the $d_{50}$ values in the free particles, and vice versa.

Measurement of Mechanical Properties of Film

Mechanical properties are determined to DIN EN ISO 527-1 to 3.

Haze

Haze is determined by a method based on ASTM D1003-52.

Roughness

Roughness $R_a$ of the film is determined to DIN 4768.

Yellowness Index

Yellowness index (YID) is the deviation from the colorless state in the "yellow" direction and is determined to DIN 6167.

Measurement of Antimicrobial Activity

The antimicrobial activity is determined by a method based on ASTM E2149-01 (1 g of sample, 50 ml of 0.3 mM $KH_2PO_4$, $1 \times 10^5$ *E. coli*/ml, 0.01% of Q2-5211 surfactant). The reduction in number of *Escherichia coli* after 24 hours is determined.

Measurement of Antimicrobial Activity After Cleaning

The film is wiped manually 5 times with a cottom cloth and then dried overnight in air. The cotton cloth here has been saturated with a mixture composed of 95% of water and 5% of ethanol. This procedure is repeated for 30 successive days. After said procedure, and after one day of waiting time at 25° C. and 50% rel. humidity, antimicrobial activity is determined as stated above.

Break-Offs During Film Production

The number of film break-offs per unit of time during production is compared with that during production of prior-art film and the percentage deviation is determined.

EXAMPLES

Raw materials MB1-5 comprise from 0.9 to 1.3% by weight of DEG; RT49 comprises 0.6% by weight of DEG; all of the raw materials mentioned (except S1) comprise <0.2% by weight of IPA and other diols and dicarboxylic acids at <0.1% by weight.

Example 1

A single-layer film of thickness 20 µm was produced. The raw materials were melted in a twin-screw extruder and extruded through a flat-film die.
The raw materials added were as follows:
10% by weight of MB1 =10% by weight of CYASORB® 1164 UV stabilizer (Cytec Inc., USA) and 90% by weight of polyethylene terephthalate (prepared by incorporating the UV stabilizer into the polyester in a twin-screw extruder)
3% by weight of MB3 =10 000 ppm of $SiO_2$ particles (SYLYSIA® 320;producer Fuji Sylysia, JP, with particle size $d_{50}$ =2.5 µm) and 99% by weight of polyethylene terephthalate
87% by weight of RT49 polyethylene terephthalate from Invista, DE The prefilm was stretched longitudinally with a stretching factor of 3.5 at a temperature of 102° C., and then coated with coating dispersion 1 by the reverse-gravure process.

Coating dispersion 1 comprises 2% by weight of dimethyloctadecyl[3-(trimethoxysilyl)propyl]ammonium chloride (CAS 27668-52-6, Devan Chemicals, BE), 0.3% by weight of methanol, the remainder being water.

2 g of said dispersion were applied per $m^2$.

The film was then oriented transversely at 105° C. with a stretching factor of 4.1. The film was then heat-set, the maximum temperature being 232° C.
Modulus of Elasticity
Longitudinal: 4650 N/$mm^2$
Transverse: 5050 N/$mm^2$
Yellowness index: 2.8
Roughness $R_a$: 55 nm
Antimicrobial Action
Reduction in number of *Escherichia coli* after 24 h: 99.5%
  after cleaning: reduction in number of *Escherichia coli* after 24 h: 82%.

Example 2

A film was produced as described in Example 1, but coating dispersion 2 was used:
Coating dispersion 2 comprises 2% by weight of dimethyloctadecyl[3-(trimethoxysilyl)propyl]ammonium chloride (CAS 27668-52-6, Devan Chemicals, BE), 0.3% by weight of methanol, 2% by weight of Z6020 from Dow Corning (aminosilane), the remainder being water.

2 g of said dispersion were applied per $m^2$.
Modulus of Elasticity
Longitudinal: 4600 N/$mm^2$
Transverse: 5100 N/$mm^2$
Yellowness index: 3.2
Roughness $R_a$: 58 nm
Antimicrobial Action
Reduction in number of *Escherichia coli* after 24 h: 99.9%
  after cleaning: reduction in number of *Escherichia coli* after 24 h: 90.8%

Example 3

A film was produced as described in Example 1, but coating dispersion 3 was used:
Coating dispersion 3 corresponds to that of example 1 of U.S. Pat. No. 4,571,363, but 3% by weight of dimethyloctadecyl[3-(trimethoxysilyl)propyl]ammonium chloride (CAS 27668-52-6, Devan Chemicals, BE), and 0.3% by weight of methanol were added; the remainder being water.

2 g of said dispersion were applied per $m^2$.
Modulus of Elasticity
Longitudinal: 4550 N/$mm^2$
Transverse: 5060 N/$mm^2$
Yellowness index: 2.9
Antimicrobial Action
Reduction in number of *Escherichia coli* after 24 h: 99.9%
  after cleaning: reduction in number of *Escherichia coli* after 24 h: 97.1%

Example 4

A three-layer film of thickness 20 µm was produced. The thickness of the antimicrobial outer layer A was 2.2 µm. The thickness of the sealable outer layer C was 2.0 µm. The thickness of the base layer (B) was 15.8 µm. The raw materials for each layer were melted separately in a twin-screw extruder and extruded through a three-layer flat-film die.

The following raw materials were added in the base layer (B):
10% by weight of MB1
90% by weight of RT49 polyethylene terephthalate
The following raw materials were used in the antimicrobially modified outer layer (A)
20% by weight of MB1
20% by weight of MB2=10% by weight of AK80H silver-containing zeolite (Agion, USA) ($d_{50}$=2 µm; zeolite with 5% by weight of silver and 13% by weight of zinc) and 90% by weight of polyethylene terephthalate (prepared by incorporating the zeolite into the polyester in a twin-screw extruder)
60% by weight of RT49 polyethylene terephthalate.

The composition of the raw materials for the sealable outer layer (C) was as follows:
97% by weight of SI, composed of an amorphous copolyester having 80 mol % of ethylene terephthalate and 20 mol % of ethylene isophthalate (prepared by the transesterification process using Mn as transesterification catalyst: Mn concentration: 100 ppm)
3% by weight of MB3 =10 000 ppm of $SiO_2$ particles (SYLYSIA® 320;producer Fuji Silysia, JP, with particle size $d_{50}$ =2.5 µm) and 99% by weight of polyethylene terephthalate.

Coextrusion followed by stepwise longitudinal and transverse orientation was then used to produce a transparent, three-layer film with ABC structure. The outer layer side (A) (=antimicrobial outer layer) of the longitudinally stretched film was coated with coating dispersion 1 by the reverse-gravure process.

2 g of said dispersion were applied per $m^2$.

The production conditions of the individual steps of the process were:

| | | | |
|---|---|---|---|
| Extrusion | Temperatures | A-layer | 281° C. |
| | | B-layer | 382° C. |
| | | C-layer | 285° C. |
| | Temperature of take-off roll | | 20° C. |
| Longitudinal stretching | Heating temperature | | 70-120° C. |
| | Stretching temperature | | 115° C. |
| | Longitudinal stretching ratio | | 3.7 |

| Transverse stretching | Heating temperature | 100° C. |
| --- | --- | --- |
| | Stretching temperature | 125° C. |
| | Transverse stretching ratio | 4 |
| Setting | Temperature | 232° C. |
| | Duration | 3 s |

Modulus of Elasticity
Longitudinal: 4500 N/mm²
Transverse: 5100 N/mm²
Yellowness index: 2.4
Roughness $R_a$: 200 nm
Antimicrobial Action
Reduction in number of *Escherichia coli* after 24 h: 99.9%
after cleaning: reduction in number of *Escherichia coli* after 24 h: 99.7%

Comparative Example

Commercially available standard RNK 23 polyester film (Mitsubishi Polyester Film GmbH, DE); polyester monofilm of thickness 23 μm, no coating)
Antimicrobial Action
Reduction in number of *Escherichia coli* after 24 h: 0%
after cleaning: reduction in number of *Escherichia coli* after 24 h: 0%

The invention claimed is:

1. A biaxially oriented polyester film comprising at least one base layer (B) and a single dried antimicrobially active coating dispersion on at least one side of said film, said antimicrobial coating
    a) comprising an ammonium silane of the following formula (I):

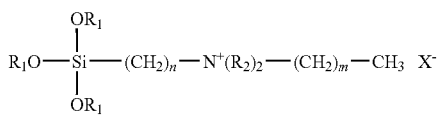

where
R₁ and R₂ are in each case identical or different and, independently of each other, are hydrogen moieties or C1-C8-alkyl moieties, which are straight-chain or—in the case of C3-C8-alkyl moieties—can be branched; and where in aqueous dispersions, one, two or all of the R₁ moieties are hydrogen;
n is greater than 0 and smaller than 10;
m is greater than 0 and smaller than 30;
X- is chloride, sulfate, or nitrate;
and
    b) the thickness of the coating is smaller than 1 μm, and said film exhibits a reduction in number of *Esherichia coli* after 24 hours as measured in accordance with ASTM E2149-01 ranging from 99.5 to 99.9%.

2. The polyester film as claimed in claim 1, wherein the coating is applied in-line.

3. The polyester film as claimed in claim 1, wherein said film is a multilayer film.

4. The polyester film as claimed in claim 1, wherein said film also comprises, alongside the zeolite, further inorganic and/or organic particles.

5. The polyester film as claimed in claim 1, wherein said film comprises at least one dye that is soluble in the polyester.

6. The polyester film as claimed in claim 1, wherein said film has a total thickness of from 5 to 500 μm.

7. A process for the production of a film as claimed in claim 1, said process comprising melting the polymers corresponding to the individual layers in an extruder and coextruding the melted polymers through a flat-film die to form a prefilm, drawing off the resultant prefilm for solidification on one or more rolls, biaxially stretching the solidified prefilm, and heat-setting and winding up the biaxially stretched film,
    said process further comprising providing at least one antimicrobially active coating to the film, wherein the antimicrobial coating
    a) comprises an ammonium silane of the following formula (I):

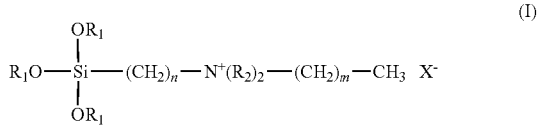

where
R₁ and R₂ are in each case identical or different and, independently of each other, are hydrogen moieties or C1-C8-alkyl moieties, which are straight-chain or—in the case of C3-C8-alkyl moieties—can be branched; and where in aqueous dispersions, one, two or all of the R₁ moieties are hydrogen;
n is greater than 0 and smaller than 10;
m is greater than 0 and smaller than 30;
X— is chloride, sulfate, or nitrate;
and
    b) the thickness of the coating is smaller than 1 μm.

8. Interior cladding, furniture cladding, air-conditioning systems, filter housings, medical equipment, cold stores, refrigerators, medical packaging, food-or drink-packaging, sanitary items, hygiene items, wound plasters, apparel, or greenhouses comprising a film as claimed in claim 1.

9. The polyester film as claimed in claim 1, wherein said film comprises, alongside the base layer (B), a further layer (A) under the antimicrobial coating, said further layer (A) comprising an antimicrobial agent.

10. The polyester film as claimed in claim 9, wherein the antimicrobial agent is based on elemental silver and/or silver ions as biocide.

11. The polyester film as claimed in claim 9, wherein the thickness of the layer (A) is <10 μm.

12. The polyester film as claimed in claim 9, wherein the concentration present of the zeolite in the layer (A) is from 0.5 to 15% by weight, based on the weight of the zeolite-containing layer.

13. The polyester film as claimed in claim 9, which comprises, alongside the base layer (B) and the layer (A), a further layer (C), located on that side of the base layer (B) opposite to the layer (A), and having no antimicrobial coating.

14. The polyester film as claimed in claim 13, wherein the layer (C) is sealable.

15. The polyester film as claimed in claim 9, wherein the antimicrobial agent is a silver-loaded zeolite.

16. The polyester film as claimed in claim 15, wherein the median particle size ($d_{50}$) of the zeolite is from 0.5 to 15 μm.

17. The polyester film as claimed in claim 15, wherein the amount of silver in the zeolite is from 0.5 to 20% by weight, based on the weight of the zeolite.

18. The polyester film as claimed in claim 15, wherein the zeolite contains from 1 to 20% by weight of zinc and/or copper, based on the weight of the zeolite.

19. The polyester film as claimed in claim 1, wherein said film comprises at least one UV stabilizer.

20. The polyester film as claimed in claim 19, wherein the UV stabilizer is a triazine.

21. A polyester film as claimed in claim 1, wherein $R_1$ and $R_2$ are identical and —$CH_3$; n is from 2 to 5; and m is from 6 to 25.

22. A polyester film as claimed in claim 21, wherein n is 3; and m is from 15 to 20.

23. A polyester film as claimed in claim 22, wherein m is 17.

24. A biaxially oriented polyester film comprising at least one base layer (B) and a single dried antimicrobially active coating dispersion on at least one side of said film, said antimicrobial coating
  (a) comprising an ammonium silane of the following formula (I):

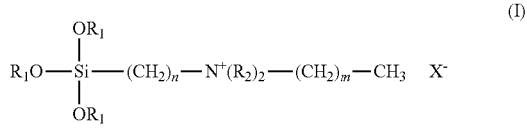

where
  $R_1$ and $R_2$ are in each case identical or different and, independently of each other, are hydrogen moieties or C1-C8-alkyl moieties, which are straight-chain or—in the case of C3-C8-alkyl moieties—can be branched; and where in aqueous dispersions, one, two or all of the $R_1$ moieties are hydrogen;
  n is greater than 0 and smaller than 10;
  m is greater than 0 and smaller than 30;
  X— is chloride, sulfate, or nitrate;
and
  (b) the thickness of the coating is smaller than 1 µm,
wherein said film comprises, alongside the base layer (B), a further layer (A) under the antimicrobial coating, said further layer (A) comprising an antimicrobial agent;
  the thickness of the layer (A) is <10 µm; and
  the antimicrobial agent is a silver-loaded zeolite and said further layer (A) is formed from polyester composed of less than 99 mol % of ethylene glycol units and terephthalic acid units that further contains one or more of (i) dicarboxylic acid other than terephthalic; (ii) diethylene glycol and (iii) diol other than etyhylene glycol or diethylene glycol,
and said film exhibits a reduction in number of *Esherichia coli* after 24 hours as measured in accordance with ASTM E2149-01 ranging from 99.5 to 99.9%.

25. A biaxially oriented polyester film comprising at least one base layer (B) and an antimicrobially active coating on at least one side of said film, said antimicrobial coating
  b) comprising an ammonium silane of the following formula (I):

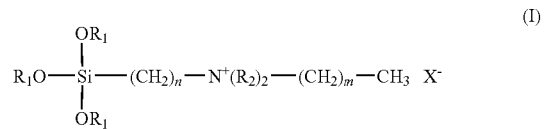

where
  $R_1$ and $R_2$ are in each case identical or different and, independently of each other, are hydrogen moieties or C1-C8-alkyl moieties, which are straight-chain or—in the case of C3-C8-alkyl moieties—can be branched; and where in aqueous dispersions, one, two or all of the $R_1$ moieties are hydrogen;
  n is greater than 0 and smaller than 10;
  m is greater than 0 and smaller than 30;
  X— is chloride, sulfate, or nitrate;
and
  b) the thickness of the coating is smaller than 1 µm,
wherein said ammonium silane is combined with a coating component selected from (i) other silanes and/or aminosilanes, (ii) acrylates or (iii) silicone and said ammonium silane is present in an amount ranging from 0.5 to 75% by weight in the coating dispersion; said other silanes and/or aminosilanes are present in an amount ranging from 0.5 to 35% by weight, based on the coating dispersion; and said acrylates are present in an amount ranging from 0.5 to 25% by weight in the coating dispersion,
and said film exhibits a reduction in number of *Esherichia coli* after 24 hours as measured in accordance with ASTM E2149-01 ranging from 99.5 to 99.9%.

* * * * *